United States Patent
Agrawal et al.

(10) Patent No.: US 12,445,404 B1
(45) Date of Patent: Oct. 14, 2025

(54) METHODS AND SYSTEMS FOR SURFACING UNCONSUMED COMMUNICATIONS

(71) Applicant: Motorola Mobility LLC, Chicago, IL (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 27 days.

(21) Appl. No.: 18/620,585

(22) Filed: Mar. 28, 2024

(51) Int. Cl.
| | |
|---|---|
| *G06F 15/16* | (2006.01) |
| *H04L 51/08* | (2022.01) |
| *H04L 51/10* | (2022.01) |
| *H04L 51/216* | (2022.01) |
| *H04L 51/56* | (2022.01) |

(52) U.S. Cl.
CPC .............. *H04L 51/56* (2022.05); *H04L 51/08* (2013.01); *H04L 51/10* (2013.01); *H04L 51/216* (2022.05)

(58) Field of Classification Search
CPC ....... H04L 51/56; H04L 51/216; H04L 51/08; H04L 51/10
USPC .......................................................... 709/206
See application file for complete search history.

(56) References Cited

U.S. PATENT DOCUMENTS

| | | | | |
|---|---|---|---|---|
| 6,557,027 B1 * | 4/2003 | Cragun | .................. | H04L 51/04 719/329 |
| 7,200,635 B2 * | 4/2007 | Yashchin | ............. | G06Q 10/107 709/224 |
| 7,383,307 B2 * | 6/2008 | Kirkland | ................. | H04L 51/04 709/248 |
| 7,412,491 B2 * | 8/2008 | Gusler | ................. | G06Q 10/107 709/207 |
| 7,475,110 B2 * | 1/2009 | Kirkland | ............... | H04L 51/216 709/204 |
| 7,480,696 B2 * | 1/2009 | Kirkland | ................. | H04L 51/04 709/205 |
| 7,693,951 B2 * | 4/2010 | Gusler | ................. | G06Q 10/107 709/206 |

(Continued)

OTHER PUBLICATIONS

Arun, Abhishek, et al., "Meeting Insights: Contextual assistance for everyone", Microsoft Research Blog [retrieved Jan. 29, 2024]. Retrieved from the Internet <https://www.microsoft.com/en-us/research/blog/meeting-insights-contextual-assistance-for-everyone/>, May 28, 2020, 9 pages.

*Primary Examiner* — Alicia Baturay
(74) *Attorney, Agent, or Firm* — FIG. 1 Patents

(57) ABSTRACT

In aspects of methods and systems for surfacing unconsumed communications, an example device includes at least one memory and at least one processor. The at least one processor is configured to cause the device to detect that an ongoing communication pertaining to a first topic includes one or more first communications in a first communication channel being accessed by a user of the device, detect one or more second communications in a second communication channel associated with the user based on the one or more second communications including an unconsumed communication, determine whether the first topic and a second topic of the one or more second communications are similar, generate, based on the first topic and the second topic being similar, a reference link to the one or more second communications of the second communication channel, and display the reference link in the first communication channel.

20 Claims, 6 Drawing Sheets

(56) References Cited

U.S. PATENT DOCUMENTS

| | | | |
|---|---|---|---|
| 7,725,538 B2* | 5/2010 | Kirkland | H04L 51/04 709/204 |
| 7,904,515 B2* | 3/2011 | Ambati | G06Q 10/10 715/753 |
| 8,001,126 B2* | 8/2011 | Berry | H04L 65/403 709/206 |
| 8,037,153 B2* | 10/2011 | Montero | H04L 51/42 718/1 |
| 8,140,981 B2* | 3/2012 | Gusler | G06Q 10/107 715/753 |
| 8,190,999 B2* | 5/2012 | Chen | G06Q 10/107 715/753 |
| 8,250,154 B2* | 8/2012 | Limberg | G06Q 10/107 709/219 |
| 8,312,095 B2* | 11/2012 | Chao | G06Q 10/10 709/207 |
| 8,418,069 B2* | 4/2013 | Wanderski | G06Q 10/00 715/842 |
| 8,484,216 B2* | 7/2013 | Berry | H04L 65/403 709/204 |
| 8,577,972 B1* | 11/2013 | Heikes | H04L 51/04 709/206 |
| 8,805,935 B2* | 8/2014 | Kirkland | H04L 51/04 709/227 |
| 8,843,565 B2* | 9/2014 | Essenmacher | G06Q 10/107 709/205 |
| 9,070,118 B2* | 6/2015 | Heikes | H04L 51/04 |
| 9,773,213 B2* | 9/2017 | Wanderski | G06Q 10/00 |
| 10,102,504 B2* | 10/2018 | Heikes | G06Q 10/107 |
| 10,110,523 B2* | 10/2018 | Badge | H04L 51/046 |
| 10,116,599 B2* | 10/2018 | Wu | G06F 3/0483 |
| 10,268,340 B2* | 4/2019 | Chen | G06Q 10/107 |
| 10,523,613 B1* | 12/2019 | Alm | H04L 51/216 |
| 10,621,231 B2* | 4/2020 | Marsh | G06F 16/7844 |
| 10,678,401 B2* | 6/2020 | Deets, Jr. | H04L 51/216 |
| 10,757,050 B2* | 8/2020 | Badge | H04L 51/046 |
| 10,901,603 B2* | 1/2021 | Boothroyd | H04L 51/216 |
| 11,848,900 B2* | 12/2023 | White | H04L 51/046 |
| 11,855,945 B2* | 12/2023 | Kim | H04L 51/216 |
| 12,120,081 B2* | 10/2024 | Choi | G06F 16/93 |
| 12,141,204 B2* | 11/2024 | Vangala | G06Q 10/107 |
| 12,177,176 B1* | 12/2024 | Mehta | H04L 51/21 |
| 12,255,749 B2* | 3/2025 | Callegari | H04L 12/1822 |
| 12,299,618 B2* | 5/2025 | Vangala | G06Q 10/06311 |
| 2021/0297275 A1* | 9/2021 | Wiener | G06F 16/345 |
| 2023/0066231 A1* | 3/2023 | White | H04N 7/147 |
| 2023/0403435 A1* | 12/2023 | Liu | H04N 21/478 |
| 2025/0104699 A1* | 3/2025 | Murthy | G06F 3/04817 |

* cited by examiner

METHODS AND SYSTEMS FOR SURFACING UNCONSUMED COMMUNICATIONS

BACKGROUND

In some scenarios, users of computing devices may discuss a certain topic with one another across several communication channels. For example, a user may discuss a certain topic with other users in different chat windows, chat applications, video conferencing applications, e-mail applications, etc. As communication technologies evolve, multi-channel communication scenarios are becoming more prevalent due to the diverse functionalities each communication platform offers (e.g., chat application, video conferencing application, e-mail application, etc.), various groups or sub-groups of users subscribing to certain communication channels (e.g., discussion groups, chat groups, work groups, social groups, etc.), user preference or familiarity with certain platforms, user reliance on multiple computing devices (e.g., smartphones, desktop computers, etc.), among other reasons.

BRIEF DESCRIPTION OF THE DRAWINGS

Implementations of the techniques for methods and systems for surfacing unconsumed communications are described with reference to the following Figures. The same numbers may be used throughout to reference like features and components shown in the Figures.

DETAILED DESCRIPTION

Figure 1:
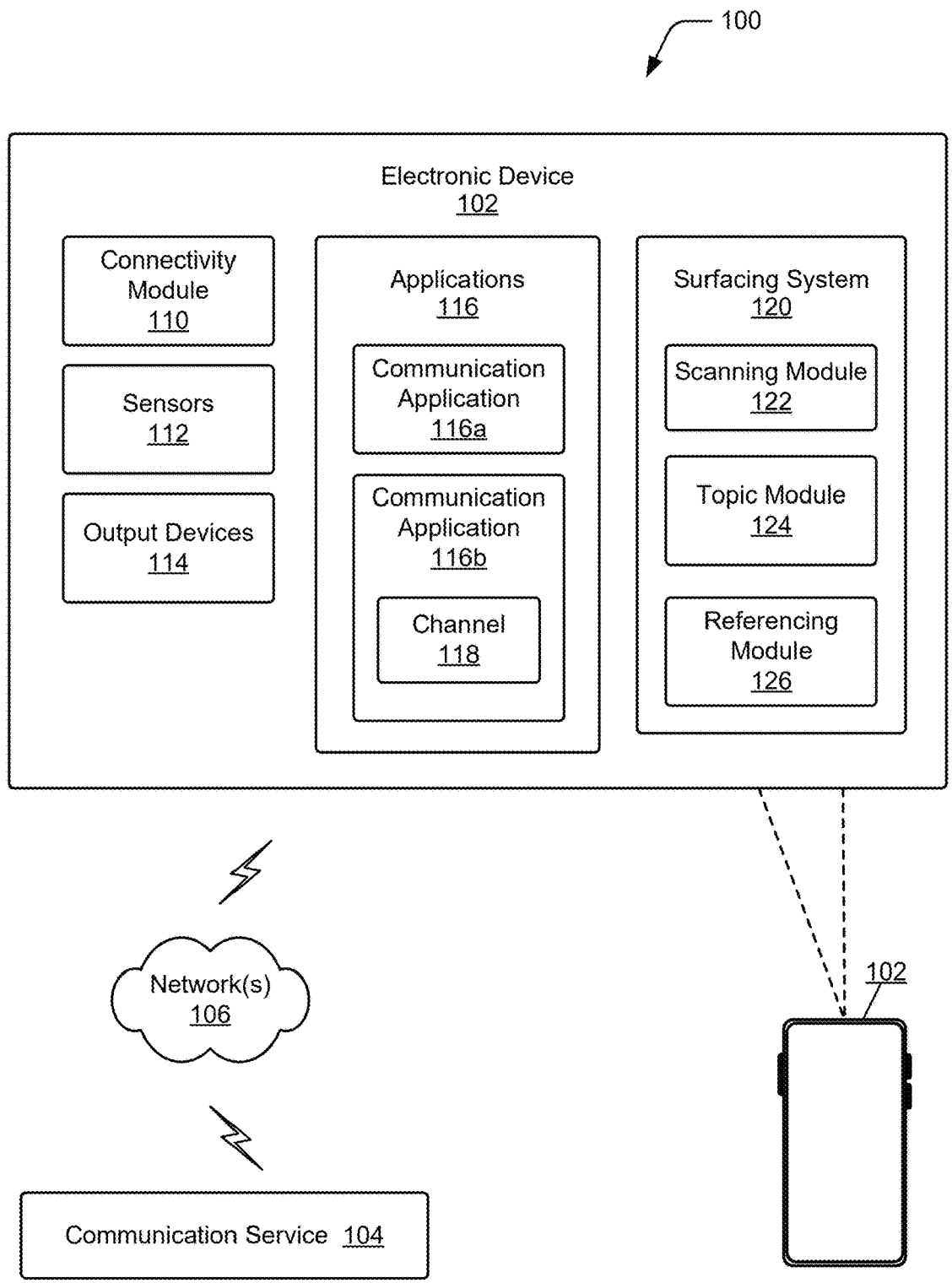
FIG. 1 illustrates an example system for surfacing unconsumed communications in accordance with one or more implementations as described herein.

Implementations of the techniques for surfacing unconsumed communications may be implemented as described herein. An electronic device, such as a mobile phone, may be configured to perform techniques for surfacing unconsumed communications as described herein. In one or more implementations, an electronic device includes a surfacing system, which can be used to implement aspects of the techniques described herein.

In some computing environments, the phenomenon of discussing a certain topic across multiple channels simultaneously (or at different times) among one or more groups of people has become increasingly prevalent. A channel or communication channel refers to a route or path through which communications are passed, such as different platforms, different user interface components (e.g., chat windows) of different platforms, and so forth. In some scenarios, users seamlessly traverse various platforms such as chat applications, collaborative development applications, conferencing applications, e-mail applications, among others, while engaging in discussions that often transcend the boundaries of a single specific communication channel. Even within a certain platform (e.g., a chat application), users may discuss the same topic over different communication channels (e.g., different chat windows).

This multi-channel approach may be due to the diverse functionalities each platform offers. For instance, users participating in a brainstorming session might initiate their discussion on a messaging application that enables the users to quickly share an overview of their ideas. As their discussion evolves, one or more participants may start using a different platform that provides different functionalities (e.g., project collaboration application, video conferencing application, document sharing application, presentation slide sharing application, etc.) to carry on their discussion. Other participants may use other communication channels and/or may announce the discussion to other users on other channels, and so on. Thus, users employ multi-channel communication for various reasons such as convenience, context, device availability, nature of conversation, user preferences (e.g., simple text application versus collaborative application that allows video or document sharing, etc.), among other reasons. Additionally, multi-channel communication may allow individual users to blend the functionalities of different communication channels to maximize efficiency and effectiveness.

Unfortunately, in some scenarios, engaging across multiple communication channels could be cumbersome or could lead to miscommunication issues. For instance, a user may inadvertently respond to outdated information or discussion on one communication channel (e.g., chat window) while being unaware of updates or developments pertaining to the same topic that were submitted on another communication channel (e.g., another chat window or another application) but not yet viewed by the user. This discrepancy may result in miscommunication or confusion from the user or other users reading the user's messages. For example, if the user responds in a first communication channel without being aware of relevant updates to the discussion on a second communication channel, the user may inadvertently contribute outdated, conflicting, irrelevant, redundant, or even contradictory information on the first communication channel. Moreover, in some scenarios, the user's response may disrupt the flow of the conversation, e.g., leading to confusion among other participants who are not synchronized across both communication channels. Thus, the lack of synchronization across channels in conventional systems poses several technical problems and may reduce the effectiveness and/or efficiency of multi-channel communication pertaining to a certain topic. For instance, conflicting or uninformed communications may potentially impact decision-making processes, collaborative efforts, and overall coherence within group(s) participating in multi-channel communication.

To address these issues, the present disclosure provides methods and systems for surfacing unconsumed communications (e.g., from different sources or channels) related to a certain topic to a user. In an example, a device of a user is configured to detect that an ongoing communication pertaining to a first topic includes one or more first communications in a first communication channel being accessed by the user. The device also detects one or more second communications in a second communication channel that include at least one unconsumed communication (e.g., unread message, etc.) related to the first topic. The device also determines whether the first topic of the one or more first communications and a second topic of the one or more second communications are similar. To facilitate this, for instance, the device may use a machine learning model trained to determine topic similarity and/or topic correlation between user communications in different channels. If the first topic and the second topic are deemed to be similar (or the same), then the device generates and outputs a reference link to the one or more second communications in the first communication channel. The reference link, for instance, may include a notification that alerts the user that updates were posted on the second channel that are relevant to the topic being discussed on the first channel the user is currently viewing, and/or a selectable link that the user can select to view the second channel (e.g., before submitting a message on the first channel).

Thus, the example systems and methods herein advantageously enable a user to become aware of any relevant updates that are hidden (or not currently visible) from the user in the current communication channel the user is using to discuss the same or similar topic. Furthermore, the present method advantageously enables a group of users to communicate about a certain topic using multiple communication channels effectively and efficiently, without necessarily requiring each individual user to constantly and repeatedly check for updates on each communication channel they are subscribed to (including channels discussing unrelated topics).

While features and concepts of the described techniques for methods and systems for surfacing unconsumed communications is implemented in any number of different devices, systems, environments, and/or configurations, implementations of the techniques for methods and systems for surfacing unconsumed communications are described in the context of the following example devices, systems, and methods.

FIG. 1 illustrates an example system 100 for methods and systems for surfacing unconsumed communications, as described herein. The system 100 includes a electronic device 102, a communication service 104, and a communication network 106. Examples of electronic device 102 include any type of a wireless device, mobile device, mobile phone, flip phone, client device, companion device, tablet, computing device, communication device, entertainment device, gaming device, media playback device, desktop computer, any other type of computing and/or electronic device.

The electronic device 102 can be implemented with various components, such as a processor system and memory, as well as any number and combination of different components as further described with reference to the example device shown in FIG. 6. In implementations, the electronic device 102 includes a connectivity module 110, which includes various radios for wireless communication with other devices and/or other hardware for wired communication with other devices. Example devices and systems of the connectivity module 110 for wireless communication include a Bluetooth (BT) and/or Bluetooth Low Energy (BLE) transceiver, a near field communication (NFC) transceiver, among other examples. In some cases, the system and devices of the connectivity module 110 include a Wi-Fi radio, a cellular radio, a global positioning satellite (GPS) radio, and/or any available type of device communication interface.

In some implementations, the devices, applications, modules, servers, and/or services described herein communicate via the communication network 106, such as for data communication with the electronic device 102. The communication network 106 includes a wired and/or a wireless network. The communication network 106 is implemented using any type of network topology and/or communication protocol, and is represented or otherwise implemented as a combination of two or more networks, to include IP-based networks, cellular networks, and/or the Internet. The communication network 106 includes mobile operator networks that are managed by a mobile network operator and/or other network operators, such as a communication service provider, mobile phone provider, and/or Internet service provider.

The electronic device 102 includes various functionality that enables the device to implement different aspects of methods and systems for surfacing unconsumed communications, as described herein. In one or more examples, the connectivity module 110 is configured as an interface module that represents functionality (e.g., logic and/or hardware) enabling the electronic device 102 to interconnect and interface with other devices and/or networks, such as the communication network 106. For example, the connectivity module 110 enables wireless and/or wired connectivity of the electronic device 102.

The electronic device 102 optionally includes sensors 112, such as cameras, audio sensors, orientation sensors, or any other sensor configured to sense an environment of the electronic device 102 and/or to receive inputs from a user of the electronic device 102. In an example, the sensors 112 include a camera configured to detect user attention (e.g., when a user is viewing a certain chat window or other communication channel).

In examples, the electronic device 102 includes one or more output devices 114, such as any combination of display devices (e.g., screens, etc.), audio devices (e.g., speakers), haptic feedback devices, or any other type of output device. In an example, the output devices 114 include a display in which various applications and/or communication channels are presented to the user of the electronic device 102.

The electronic device 102 may include and/or implement various device applications 116, including communication applications 116a, 116b, etc., such as any type of messaging application, email application, video communication application, cellular communication application, music/audio application, gaming application, media application, social platform applications, and/or any other of the many possible types of various device applications. Many of the device applications have an associated application user interface that is generated and displayed for user interaction and viewing, such as on a display screen of the electronic device 102. Generally, an application user interface, or any other type of video, image, graphic, and the like is digital image content that is displayable on the display screen of the electronic device 102.

Each of the communication application 116a, 116b, etc. can include one or more communication channels (e.g., chat windows, discussion threads, etc.), exemplified by communication channel 118, in which a user of the electronic device 102 and/or one or more other participants share communications with one another. In examples, the communication applications 116a and/or 116b represent functionality for enabling the electronic device 102 to engage in communication with other devices. In an example, the communication application 116a and/or 116b represents a portal for interfacing with the communication service 104, such as for enabling communication (e.g., messaging thread, call session, etc.) between users of different devices.

In the example system 100 for surfacing unconsumed communications, the electronic device 102 implements a surfacing system 120 (e.g., as a device application). As shown in this example, the surfacing system 120 represents functionality of a controller (e.g., logic, software, and/or hardware) enabling aspects of the described techniques for methods and systems for surfacing unconsumed communications. In examples, the surfacing system 120 is implemented as computer instructions stored on computer-readable storage media and executed by a processor system of the electronic device 102. Alternatively, or in addition, the surfacing system 120 is implemented at least partially in hardware of the device.

In one or more implementations, the surfacing system 120 includes independent processing, memory, and/or logic components functioning as a computing and/or electronic device integrated with the electronic device 102. Alternatively, or in addition, examples include the surfacing system 120 implemented in software, in hardware, or as a combination of software and hardware components. In the example shown, the surfacing system 120 is implemented as a software application or module, such as executable software instructions (e.g., computer-executable instructions) that are executable with a processor system of the electronic device 102 to implement the techniques and features described herein. As a software application or module, the surfacing system 120 can be stored on computer-readable storage memory (e.g., memory of a device), or in any other suitable memory device or electronic data storage implemented with the controller. Alternatively or in addition, the surfacing system 120 is implemented in firmware and/or at least partially in computer hardware. For example, at least part of the surfacing system 120 is executable by a computer processor, and/or at least part of the surfacing system 120 is implemented in logic circuitry. In some examples, one or more of the functions of the surfacing system 120 are implemented using a distributed computing architecture (e.g., using one or more remote servers communicating with the electronic device 102 via the network 106).

In the depicted example, the surfacing system 120 includes a scanning module 122, a topic module 124, and a referencing module 126. It is noted however that the functionalities of the scanning module 122, the topic module 124, and the referencing module 126 can be alternatively implemented using fewer or more modules without departing from the scope of the present disclosure.

The scanning module 122 is configured to scan a plurality of communication channels (e.g., channel 118, etc.) associated with a user of the electronic device 102 for unread messages (or other unconsumed communications such as voice mails, video messages, audio messages, emails, etc.). In some examples, the scanning module 122 scans communication channels of applications in the electronic device 102, such as communication applications 116a, 116b, etc., and/or communication channels that are stored or configured on other devices (not shown) accessible to the electronic device 102 via the network 106. As an example, the user may have an account on a remote server (e.g., social network, etc.) through which one or more communication channels can be accessed. As another example, the user may have communication applications that include one or more communication channels at other electronic devices (e.g., desktop computer, smartphone, tablet, etc.) associated with the user. In examples, the scanning module 122 is configured to track and/or monitor a plurality of communication channels associated with the user. In various examples, the scanning module 122 scans the plurality of communication channels periodically, intermittently, in response to an event such as submission of a new communication, among other possibilities.

The topic module 124 is configured to analyze topics (e.g., conversation topics, etc.) of one or more communications (e.g., messages, video recordings, etc.) broadcast in the communication channels scanned by the scanning module 122. In an example, the topic module 124 is configured to determine topics of ongoing communications on one or more different communication channels. In examples, the topic module 124 determines a similarity or correlation between the topics associated with each of the tracked communication channels so as to identify ongoing communications that are related to a certain topic and/or that pertain to similar topics.

The referencing module 126 is configured to generate and output reference links to one or more unconsumed communications (e.g., unread messages) related to a topic of communications in a first communication channel that is currently being viewed by a user of the electronic device 102. For example, if the topic module 124 identifies a second communication channel (e.g., hidden or muted or archived discussion thread, etc.) that includes one or more unconsumed communications about a same or similar topic discussed on the first communication channel, the referencing module 126 is configured to output a reference link (e.g., a notification message indicating that there may be relevant messages on a different chat window and/or a link to that different chat window) in the first communication channel.

In examples, the surfacing system 120 causes the electronic device 102 to detect that an ongoing communication pertaining to a first topic includes one or more first communications in a first communication channel being accessed by a user of the electronic device; detect one or more second communications in a second communication channel associated with the user based on the one or more second communications including an unconsumed communication; determine whether the first topic and a second topic of the one or more second communications are similar; generate, based on the first topic and the second topic being similar, a reference link to the one or more second communications of the second communication channel; and display the reference link in the first communication channel.

In additional or alternative examples, the first communication channel is a first chat window of a first application, and the second communication channel is a second chat window of the first application. In additional or alternative examples, the first communication channel is associated with a first communication application, and the second communication channel is associated with a second communication application. In additional or alternative examples, the unconsumed communication is an unread message, and generating the reference link is in response to a determination that the one or more second communications include the unread message. In additional or alternative examples, the surfacing system 120 causes the electronic device 102 to detect the unread message in a muted communication channel and/or an archived communication channel. In additional or alternative examples, the surfacing system 120 causes the electronic device 102 to detect that the user is currently viewing a first unread message; and determine whether the one or more second communications include a second unread message in response to detecting that the user is currently viewing the first unread message. In additional or alternative examples, the surfacing system 120 causes the electronic device 102 to display the reference link to the second unread message at the first communication channel in response to a determination that the second unread message is submitted after the first unread message. In additional or alternative examples, determining whether the first topic and the second topic are similar includes using a machine learning model trained to determine a similarity between topics associated with user communications.

Figure 2:
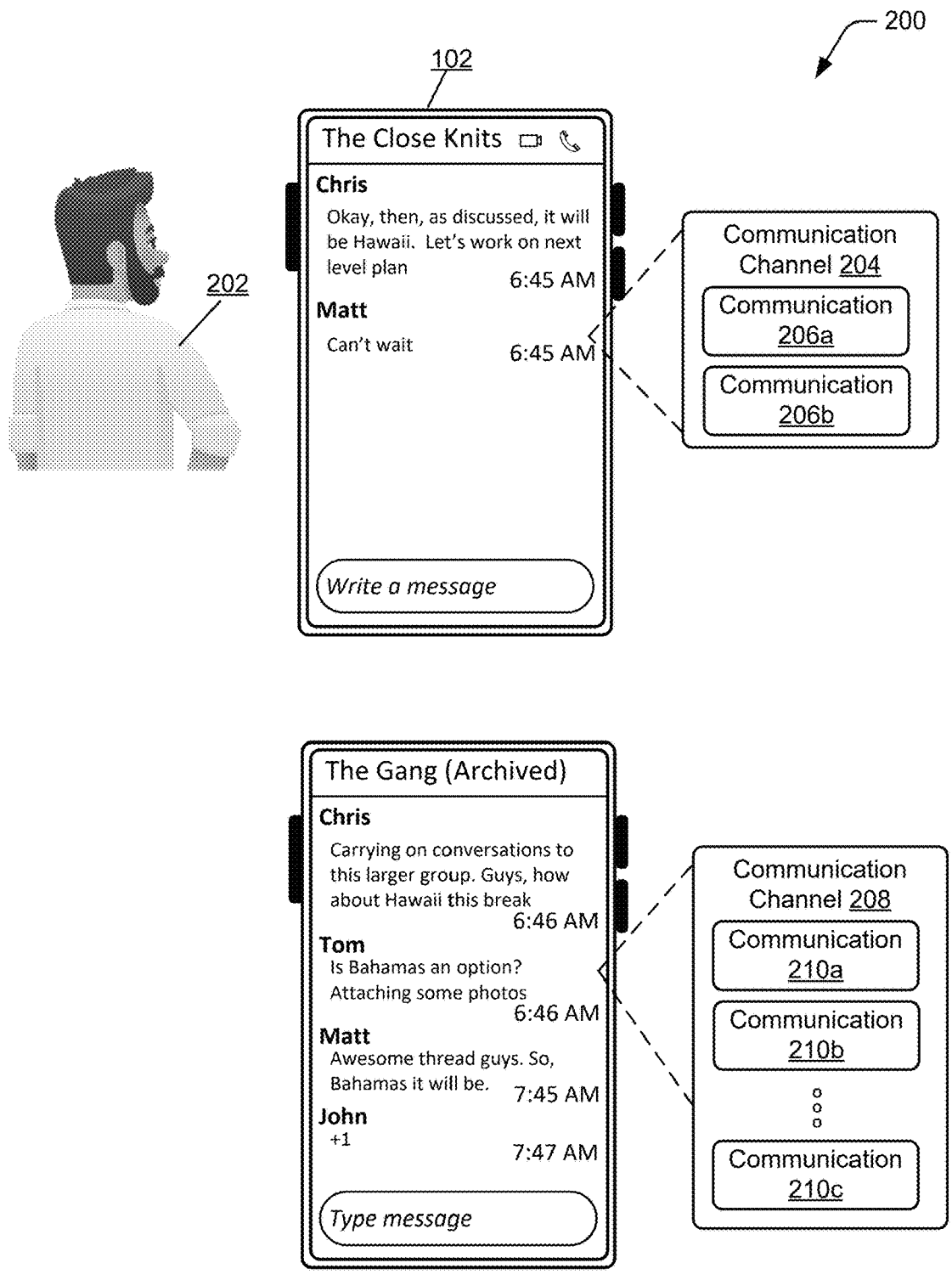
FIGS. 2 and 3 further illustrate examples of surfacing unconsumed communications in accordance with one or more implementations as described herein.
Figure 3:
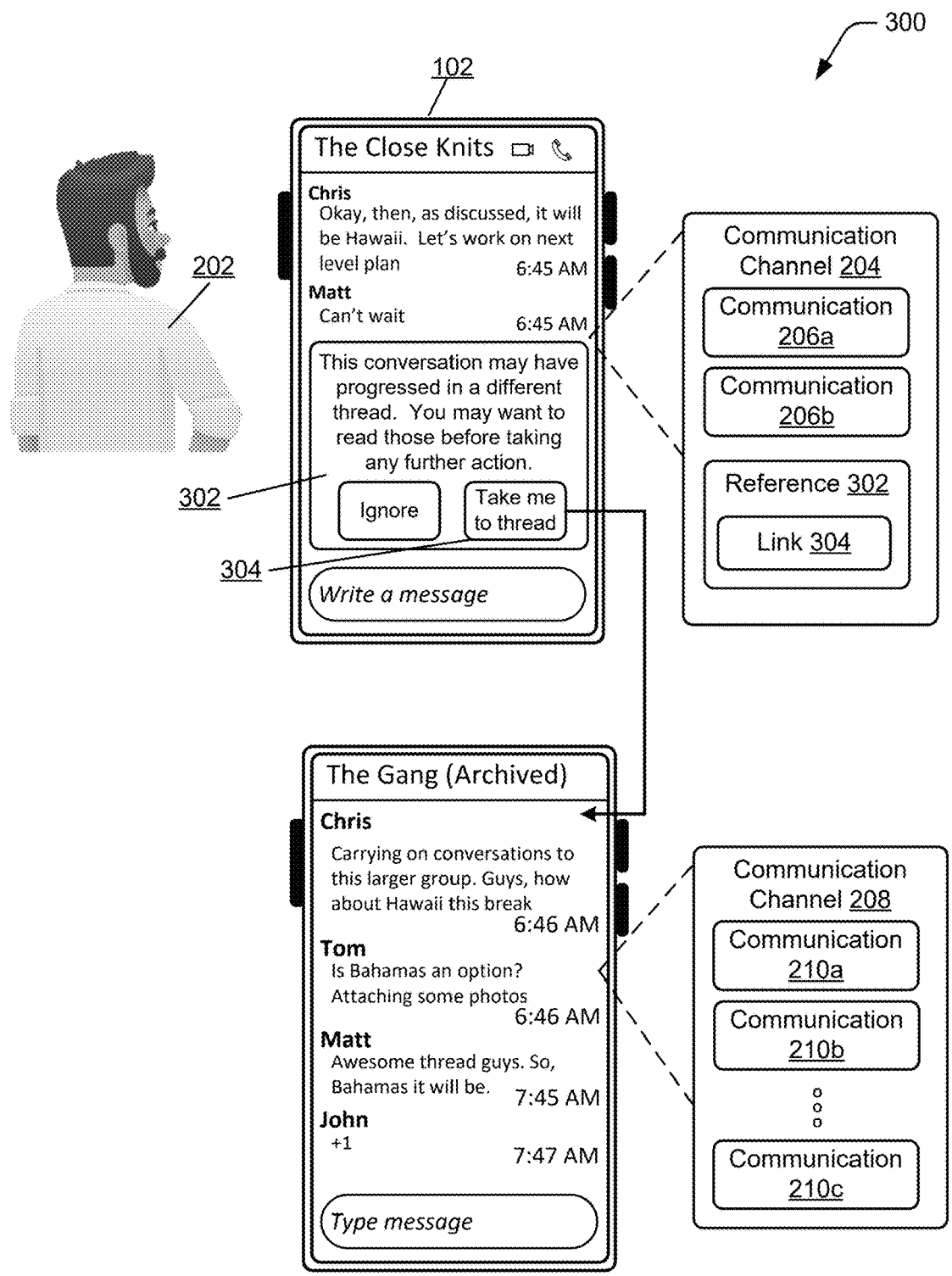

FIGS. 2 and 3 illustrate examples 200 and 300 for surfacing unconsumed communications, as described herein. The example 200 depicts a scenario where a user 202 is accessing (e.g., viewing) a first communication channel 204 via the electronic device 102. In the example shown, the first communication channel 204 is a chat window of a messaging application configured to display messages and/or other content shared among one or more participants (e.g., "Chris", "Mark", user 202, etc.) associated with the first communication channel 204. In alternative or additional examples, the first communication channel 204 includes other types of communication channels (e.g., email thread, voice messaging interface, video conferencing interface, project collaboration interface, social networking platform interface, etc.). In some examples, the surfacing system 120 detects that the user 202 is actively viewing or accessing one or more communications 206a, 206b in the first communication channel 204. For instance, the electronic device 102 includes one or more sensors 112 to detect that the user is viewing the first communication channel 204 and/or the scanning module 122 detects that the user has opened a chat window corresponding to the first communication channel 204. In an example, the user 202 opens the chat window or first communication channel 204 and views unread messages or unconsumed communications 206a and/or 206b submitted by one or more other users to the first communication channel 204.

Continuing with the scenario of example 200, the user 202 may be unaware that the topic of discussion associated with the communications 206a, 206b is also being discussed on a second communication channel 208. For instance, one or more of the users who submitted the communications 206a, 206b may resume the discussion about the same topic (e.g., a location agreed upon for holding a future group event) in the second communication channel 208 by submitting one or more communications 210a, 210b, 210c, etc., in the second communication channel 208.

In one or more implementations, the user 202 may be unaware of updated information submitted by the other users (e.g., new location such as the "Bahamas" instead of "Hawaii" being agreed upon for the future event) in the second communication channel 208 for various reasons. For example, the user 202 may have archived the second communication channel 208 such that the archived channel 208 is less visible to the user 202 on the device 102 (e.g., moved to an archive folder, disabled notification settings, etc.). As another example, the user 202 may have muted the second channel 208 such that the device 102 is configured to skip outputting notifications whenever a new unread message is received in the second channel 208. As yet another example, the user 202 may not have noticed the second communication channel 208 has new unread messages or may have assumed that new messages in the second channel 208 are unrelated to the topic being discussed in the first communication channel 204. As a result, in some scenarios, the user 202 may unnecessarily compile and/or submit communications (e.g., response messages, pictures, content, etc.) about the upcoming event under the assumption of outdated information (e.g., "Hawaii" being the selected destination instead of "Bahamas"), which could result in confusion, inefficiencies, and/or ineffective communication between the group of users using the first and second communication channels 204, 208.

To address these issues, the example 300 of FIG. 3 depicts an implementation where the electronic device 102 is configured to notify the user 202 about the presence of unread messages in the second communication channel 208 (and/or other communication channels) that are potentially related to the same topic being discussed in the first communication channel 204, by displaying a reference 302 to the potentially relevant communications in the second communication channel 208. For example, the reference 302 is displayed in the first communication channel 204 and includes a link 304 (e.g., graphical icon, button, selectable text, etc.) that the user 202 can select (e.g., tap, click, etc.) to display the second communication channel 208. To facilitate this, for example, the surfacing system 120 may be configured to scan one or more communication channels associated with the user 202 and detect whether any of the scanned channels includes unread messages (or unconsumed communications) pertaining to a same or similar topic as the messages 206a, 206b that the user 202 is currently viewing or consuming, in line with the discussion above.

Figure 4:
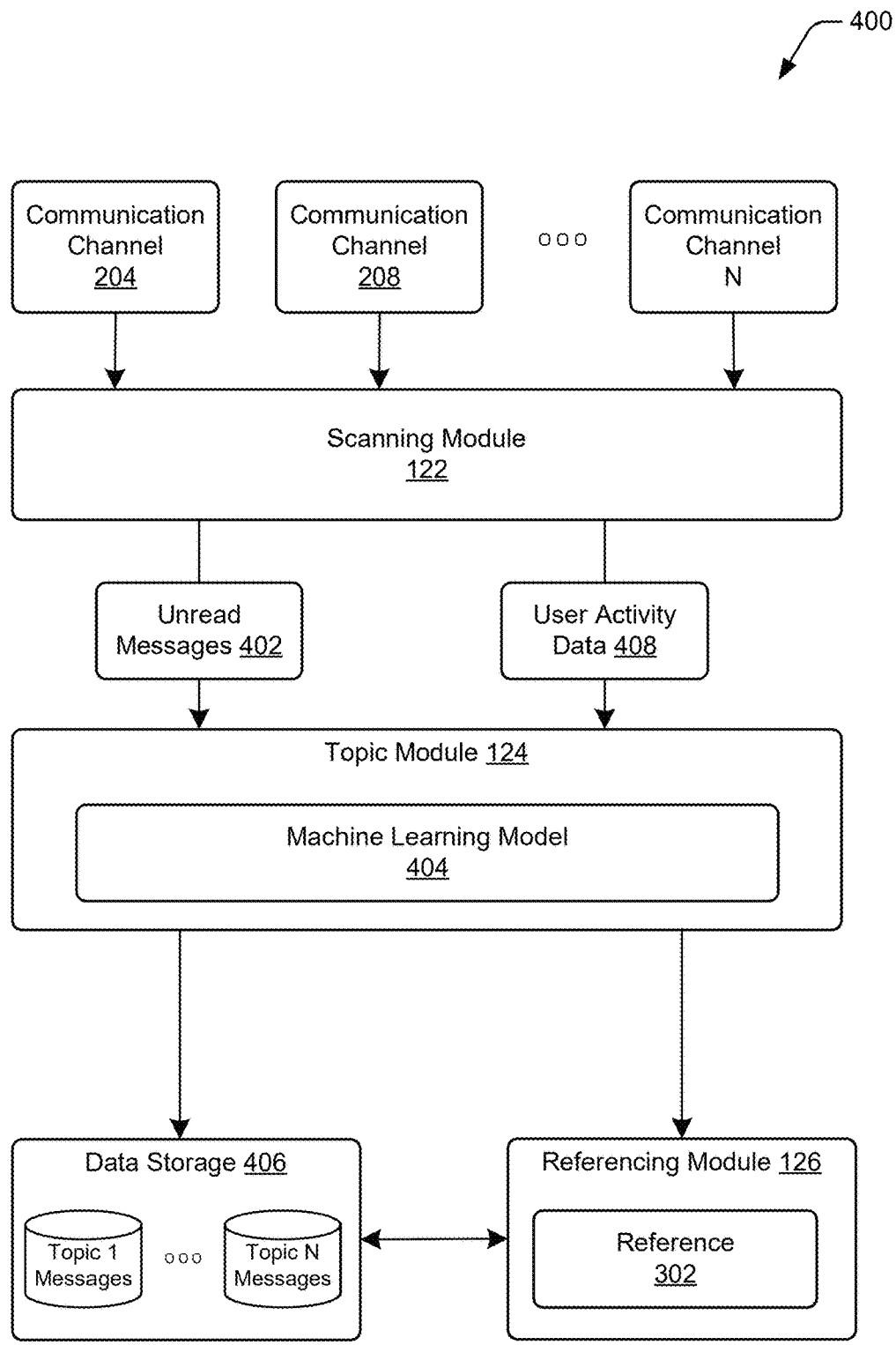
FIG. 4 illustrates an example system for implementing aspects of surfacing unconsumed communications in accordance with the present disclosure.

FIG. 4 illustrates an example system 400 for implementing aspects of surfacing unconsumed communications in accordance with the present disclosure. In the system 400, the scanning module 122 tracks, monitors, and/or scans a plurality of communication channels associated with the user 202, such as the communication channels 204, 208, etc. In some examples, the plurality of communication channels include one or more communication channels of a same communication application (e.g., different chat windows, discussion threads, etc., of the same communication application). In other examples, one or more of the plurality of communication channels are associated with different communication applications (e.g., chat applications, email applications, voice applications, social media applications, etc.). Thus, in some examples, scanning module 122 keeps track of a variety of communication channels associated with the user and of communications submitted on those channels. For example, the scanning module 122 is configured to check each communication channel 204, 208, etc., periodically (e.g., every X seconds), intermittently, or in response to any specific trigger (e.g., when a new unconsumed communications is received, when at least a threshold Y number of new unconsumed communications are received, etc.).

In the depicted example system 400, the scanning module 122 detects one or more unread messages 402 (or other type of unconsumed communication such as a voice communication, a video communication, etc.) submitted in any of the communication channels 204, 208, etc. In turn, the topic module 124 detects or determines a topic of the new unread message(s) 402. In an example, the topic module 124 uses a machine learning model 404 to predict a topic of the detected unread messages or unconsumed communications 402. For example, the machine learning model 404 includes a neural network or other type of machine learning model that is trained using labeled or unlabeled user communication data to estimate a similarity of topics being discussed in input user communications. Alternatively or additionally, the topic module 124 uses other information (e.g., times of user communications, identity of users submitting messages in two different communication channels, etc.) to facilitate determining a similarity or correlation between communications received in a first communication channel and a second communication channel. In the example system 400, once a topic is detected, references to the unread message(s) 402 or other indication of the unread message(s) 402 is stored in the data storage 406 together with an indication of a certain topic (e.g., topic 1, . . . , topic N, etc.) associated with the unread message 402. Alternatively or additionally, the topic module 124 may determine whether a first set of messages in a first channel and a second set of messages in a second channel correspond to a same or similar topic without necessarily storing references mapped to each specific topic in the data storage 406.

In some examples, the machine learning model 404 is alternatively or additionally trained to predict a similarity between user communications. For example, the machine learning model 404 may be configured to receive (e.g., as inputs) a first set of messages submitted in a first communication channel and a second set of messages submitted in a second communication channel. The machine learning model 404, in this example, may then provide an output indicating whether the two input sets of messages are similar or correlated with respect to one another.

Furthermore, in the depicted example system 400, the scanning module 122 is configured to detect user activity data 408 associated with a certain communication channel 204. In some examples, the scanning module 122 may be configured to detect that the user 202 is actively or currently accessing a first unread message in a first communication channel (e.g., communication 206a or 206b in the first communication channel 204). In an example, the scanning module 122 may use a camera or other sensor of the electronic device 102 to detect that the user is looking at a screen of the device 102 while the first communication channel is displayed. In another example, the scanning module 122 may detect that the user activated an application associated with the first communication channel (e.g., user opens a chat window). In response to detecting that the user is viewing the first unread message, in an example, the topic module 124 detects a topic of the first unread message (e.g., by searching for a reference to the first unread message in the data storage 406, or by using the machine learning model 404, etc.). Based on the detected topic and/or the data stored in the data storage 406, the reference module 126 then generates a reference 302, for example, which includes a link 304 to a second unread message related to a same or similar topic as the first unread message and displays or outputs the reference 302 in the first communication channel being accessed by the user 202, in line with the discussion above.

Example method 500 is described with reference to FIG. 5 in accordance with one or more implementations of methods and systems for surfacing unconsumed communications, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
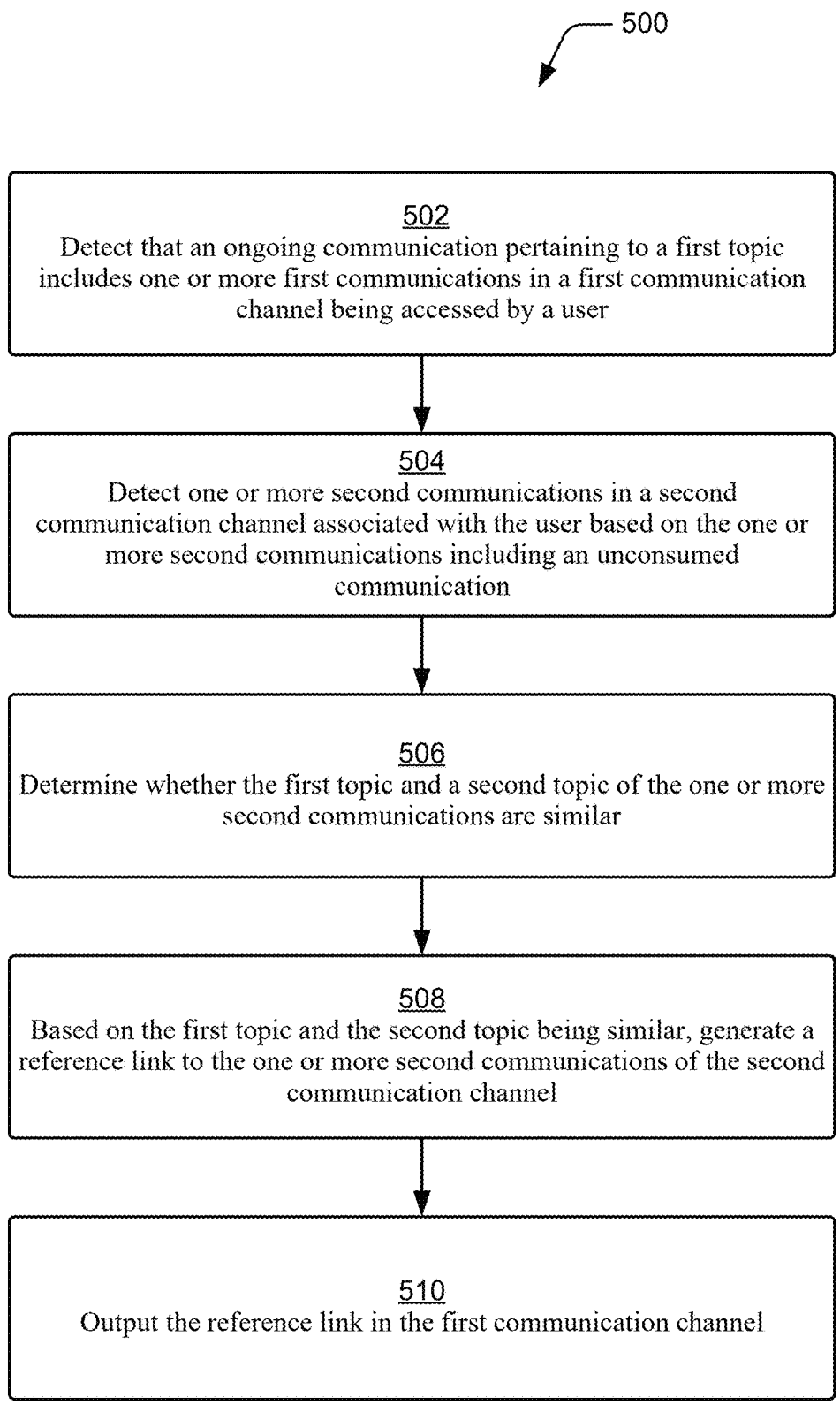
FIG. 5 illustrates an example method for surfacing unconsumed communications in accordance with one or more implementations of the techniques described herein.

FIG. 5 illustrates example method(s) 500 for surfacing unconsumed communications. The order in which the method is described is not intended to be construed as a limitation, and any number or combination of the described method operations may be performed in any order to perform a method, or an alternate method.

At block 502, an example device or system of the present disclosure, such as the electronic device 102, detects that an ongoing communication pertaining to a first topic includes one or more first communications in a first communication channel being accessed by a user. For example, the surfacing system 120 detects that the user 202 is currently accessing the first communication channel 204, which includes one or more first communications 206a, 206b about the first topic (e.g., agreement of a location "Hawaii" for a future group event, etc.).

At block 504, the electronic device 102 detects one or more second communications 210a, 210b, etc., in a second communication channel 208 based on the one or more second communications including an unconsumed communication. For example, the one or more second communications 210a, 210b, etc. may include unread messages that are related to the topic of the of one or more first communications 206a, 206b, etc., and that were not yet read or viewed by the user 202.

At block 506, the electronic device 102 detects whether the first topic of the one or more first communications and a second topic of the one or more second communications are similar. For instance, the topic module 124 uses a machine learning model 404 which may be trained to determine whether two topics associated with user communications are similar to one another. Alternatively or additionally, in examples, other artificial intelligence (AI) techniques are employed to determine a similarity or correlation between topics being discussed in two different communication channels.

At block 508, the electronic device 102 generates a reference link to the one or more second communications of the second communication channel, such as the reference link 304 for example. At block 510, the electronic device 102 outputs (e.g., displays) the generated reference link 304 in the first communication channel.

Figure 6:
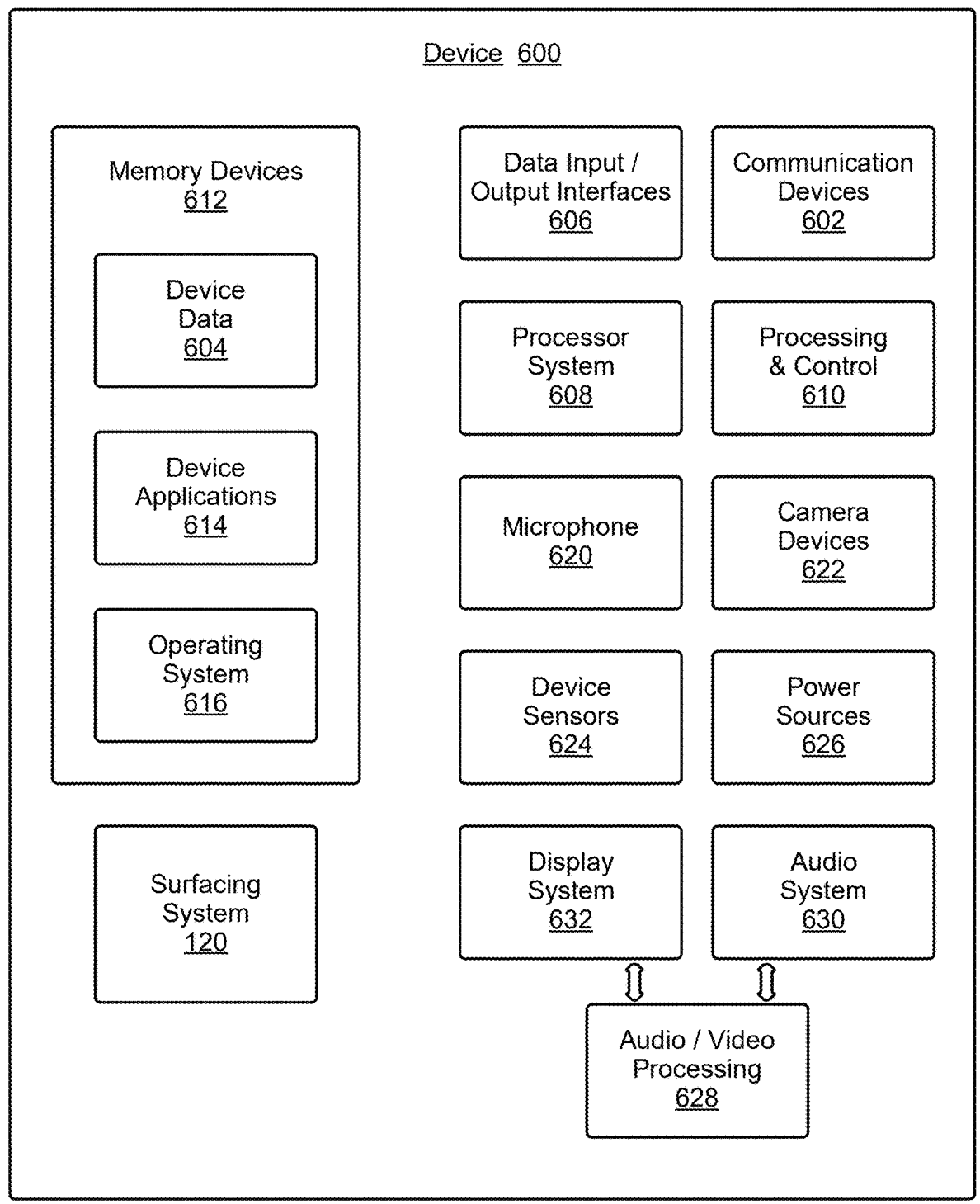
FIG. 6 illustrates various components of an example device that may be used to implement the techniques for surfacing unconsumed communications as described herein.

FIG. 6 illustrates various components of an example device 600, which can implement aspects of the techniques and features for methods and systems for surfacing unconsumed communications, as described herein. The example device 600 may be implemented as any of the devices described with reference to the previous FIGS. 1-5, such as any type of a wireless device, mobile device, mobile phone, flip phone, client device, companion device, display device, tablet, computing, communication, entertainment, gaming, media playback, and/or any other type of computing and/or electronic device. For example, the electronic device 102 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The data I/O interfaces 606 may be used to couple the device to any type of components, peripherals, and/or accessory devices, such as a computer input device that may be integrated with the example device 600. The I/O interfaces 606 may also include data input ports via which any type of data, information, media content, communications, messages, and/or inputs may be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 may be maintained as software instructions with a memory device 612 and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 includes the surfacing system 120 that implements various aspects of the described features and techniques described herein. The surfacing system 120 may be implemented with hardware components and/or in software as one of the device applications 614, such as when the example device 600 is implemented as the electronic device 102 described with reference to FIGS. 1-5. An example of the surfacing system 120 is implemented by the electronic device 102, such as a software application and/or as hardware components in the mobile device. In implementations, the surfacing system 120 may include independent processing, memory, and logic components as a computing and/or electronic device integrated with the example device 600.

The example device 600 can also include a microphone 620 (e.g., to capture an audio recording of a user) and/or camera devices 622 (e.g., to capture video images of the user during a call), as well as device sensors 624, such as may be implemented as components of an inertial measurement unit (IMU). The device sensors 624 may be implemented with various sensors, such as a gyroscope, an accelerometer, and/or other types of motion sensors to sense motion of the device. The device sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or a mobile device. The power sources may include a charging and/or power system, and may be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations for methods and systems for surfacing unconsumed communications have been described in language specific to features and/or methods, the appended claims are not necessarily limited to the specific features or methods described. Rather, the specific features and methods are disclosed as example implementations for methods and systems for surfacing unconsumed communications, and other equivalent features and methods are intended to be within the scope of the appended claims. Further, various different examples are described, and it is to be appreciated that each described example may be implemented independently or in connection with one or more other described examples.

The invention claimed is:

1. An electronic device, comprising:
   at least one memory; and
   at least one processor coupled with the at least one memory and configured to cause the electronic device to:
   detect that an ongoing communication pertaining to a first topic includes one or more first communications in a first communication channel being accessed by a user of the electronic device;
   detect one or more second communications in a second communication channel associated with the user based on the one or more second communications including an unconsumed communication;

determine whether the first topic and a second topic of the one or more second communications are similar;

based on the first topic and the second topic being similar, generate a reference link to the one or more second communications of the second communication channel; and display the reference link in the first communication channel.

2. The electronic device of claim 1, wherein the first communication channel is a first chat window of a first application, and the second communication channel is a second chat window of the first application.

3. The electronic device of claim 1, wherein the first communication channel is associated with a first communication application, and the second communication channel is associated with a second communication application.

4. The electronic device of claim 1, wherein the unconsumed communication is an unread message, and wherein generating the reference link is in response to a determination that the one or more second communications include the unread message.

5. The electronic device of claim 4, wherein the at least one processor is configured to cause the electronic device to detect the unread message in a muted communication channel.

6. The electronic device of claim 4, wherein the at least one processor is configured to cause the electronic device to detect the unread message in an archived communication channel.

7. The electronic device of claim 1, wherein the at least one processor is configured to cause the electronic device to:

detect that the user is currently viewing a first unread message; and determine whether the one or more second communications include a second unread message in response to detecting that the user is currently viewing the first unread message.

8. The electronic device of claim 7, wherein the at least one processor is configured to cause the electronic device to:

display the reference link to the second unread message at the first communication channel in response to a determination that the second unread message is submitted after the first unread message.

9. The electronic device of claim 1, wherein determining whether the first topic and the second topic are similar includes using a machine learning model trained to determine a similarity between topics associated with user communications.

10. A method, comprising:

detecting that an ongoing communication pertaining to a first topic includes one or more first communications in a first communication channel being accessed by a user;

detecting one or more second communications in a second communication channel associated with the user based on the one or more second communications including an unconsumed communication;

determining whether the first topic and a second topic of the one or more second communications are similar;

based on the first topic and the second topic being similar, generating a reference link to the one or more second communications of the second communication channel; and displaying the reference link in the first communication channel.

11. The method of claim 10, wherein the first communication channel is a first chat window of a first application, and the second communication channel is a second chat window of the first application.

12. The method of claim 10, wherein the first communication channel is associated with a first communication application, and the second communication channel is associated with a second communication application.

13. The method of claim 10, wherein the unconsumed communication is an unread message, and wherein generating the reference link is in response to determining that the one or more second communications include the unread message.

14. The method of claim 13, further comprising detecting the unread message in a muted communication channel.

15. The method of claim 13, further comprising detecting the unread message in an archived communication channel.

16. The method of claim 10, further comprising:

detecting that the user is currently viewing a first unread message; and determining whether the one or more second communications includes a second unread message in response to detecting that the user is currently viewing the first unread message.

17. The method of claim 16, further comprising:

displaying the reference link to the second unread message at the first communication channel in response to determining that the second unread message is submitted after the first unread message.

18. The method of claim 10, wherein determining whether the first topic and the second topic are similar is using a machine learning model trained to determine a similarity between topics associated with user communications.

19. A system, comprising:

at least one memory; and at least one processor coupled with the at least one memory and configured to cause the system to:

detect that an ongoing communication pertaining to a first topic includes one or more first communications in a first communication channel being accessed by a user of the system;

detect one or more second communications in a second communication channel associated with the user based on the one or more second communications including an unconsumed communication;

determine whether the first topic and a second topic of the one or more second communications are similar;

based on the first topic and the second topic being similar, generate a reference link to the unconsumed communication of the second communication channel; and output the reference link in the first communication channel.

20. The system of claim 19, wherein the first communication channel is a first chat window of a first application, and the second communication channel is a second chat window of the first application.

* * * * *